United States Patent
Talby et al.

(10) Patent No.: US 8,949,772 B1
(45) Date of Patent: Feb. 3, 2015

(54) DYNAMIC MODEL BASED SOFTWARE APPLICATION DEVELOPMENT

(75) Inventors: David Talby, Bellevue, WA (US); Scott David McMaster, Bothell, WA (US)

(73) Assignee: Amazon Technologies, Inc., Reno, NV (US)

(*) Notice: Subject to any disclaimer, the term of this patent is extended or adjusted under 35 U.S.C. 154(b) by 1057 days.

(21) Appl. No.: 12/476,163

(22) Filed: Jun. 1, 2009

(51) Int. Cl.
  G06F 9/44 (2006.01)
  G06F 9/45 (2006.01)
  G06F 11/00 (2006.01)

(52) U.S. Cl.
  USPC .......... 717/104; 717/101; 717/108; 717/124; 717/140; 714/38.14; 714/6.13

(58) Field of Classification Search
  None
  See application file for complete search history.

(56) References Cited

U.S. PATENT DOCUMENTS

| | | | |
|---|---|---|---|
| 6,647,301 B1* | 11/2003 | Sederlund et al. | 700/79 |
| 6,662,357 B1* | 12/2003 | Bowman-Amuah | 717/120 |
| 6,718,535 B1* | 4/2004 | Underwood | 717/101 |
| 6,829,722 B2* | 12/2004 | Lin | 714/6.13 |
| 6,968,546 B2* | 11/2005 | Lueh | 717/158 |
| 7,490,319 B2* | 2/2009 | Blackwell et al. | 717/124 |
| 7,570,261 B1* | 8/2009 | Edecker et al. | 345/420 |
| 7,707,557 B1* | 4/2010 | Nikolov | 717/130 |
| 7,890,806 B2* | 2/2011 | Kwong et al. | 717/124 |
| 7,954,094 B2* | 5/2011 | Cascaval et al. | 717/145 |
| 7,970,596 B2* | 6/2011 | Bade et al. | 703/13 |
| 8,001,519 B2* | 8/2011 | Conallen et al. | 717/105 |
| 8,074,203 B2* | 12/2011 | Dye et al. | 717/113 |
| 8,141,069 B2* | 3/2012 | Koehler | 717/165 |
| 8,347,402 B2* | 1/2013 | Imrey et al. | 726/27 |
| 8,549,096 B2* | 10/2013 | Gulley et al. | 709/216 |
| 2003/0167423 A1* | 9/2003 | Murakami et al. | 714/38 |
| 2005/0005261 A1* | 1/2005 | Severin | 717/108 |
| 2006/0129994 A1* | 6/2006 | Srivastava et al. | 717/124 |
| 2006/0212857 A1* | 9/2006 | Neumann et al. | 717/140 |
| 2007/0006134 A1* | 1/2007 | Larvet et al. | 717/104 |
| 2009/0172647 A1* | 7/2009 | Telang | 717/135 |
| 2010/0287528 A1* | 11/2010 | Lochmann | 717/104 |

\* cited by examiner

*Primary Examiner* — Don Wong
*Assistant Examiner* — Mohammad Kabir
(74) *Attorney, Agent, or Firm* — Novak Druce Connolly Bove + Quigg LLP

(57) ABSTRACT

A system and method of dynamically generating software is provided. Applications are created in a set of workflow models which are tested in an interpretive test environment. The models are stored in a versioning repository and code generation templates created for the models. Source code is generated and compiled for the application. Modifications to the models are tested and incorporated into a modified version of the application after subsequent testing of the model and the modified, compiled application. The modified version of the application is returned to the test environment where it becomes the basis for testing future modifications.

24 Claims, 7 Drawing Sheets

Figure 5

```
<?xml version="1.0" encoding="UTF-8"?>
<xmi:version="2.0"
 xmlns:xmi="http://www.omg.org/XMI" xmlns:xsi="http://www.w3.org/2001/XMLSchema-instance"
 xmlns:ecore="http://www.eclipse.org/emf/2002/Ecore" name="data"
 nsURI="http://www.openarchitectureware.org/oaw4.demo.emf.datamodel" nsPrefix="data">
  <eClassifiers xsi:type="ecore:EClass" name="Model">
    <eStructuralFeatures xsi:type="ecore:EAttribute" name="name"
      eType="ecore:EDataType http://www.eclipse.org/emf/2002/Ecore#//EString"/>
    <eStructuralFeatures xsi:type="ecore:EReference" name="entity" upperBound="-1"
      eType="#//Entity" containment="true"/>
  </eClassifiers>
  <eClassifiers xsi:type="ecore:EClass" name="Entity">
    <eStructuralFeatures xsi:type="ecore:EAttribute" name="name"
      eType="ecore:EDataType http://www.eclipse.org/emf/2002/Ecore#//EString"/>
    <eStructuralFeatures xsi:type="ecore:EReference" name="attribute" lowerBound="1"
      upperBound="-1" eType="#//Attribute" containment="true"/>
    <eStructuralFeatures xsi:type="ecore:EReference" name="reference" upperBound="-1"
      eType="#//EntityReference" containment="true"/>
  </eClassifiers>
  <eClassifiers xsi:type="ecore:EClass" name="Attribute">
    <eStructuralFeatures xsi:type="ecore:EAttribute" name="name"
      eType="ecore:EDataType http://www.eclipse.org/emf/2002/Ecore#//EString"/>
    <eStructuralFeatures xsi:type="ecore:EAttribute" name="type"
      eType="ecore:EDataType http://www.eclipse.org/emf/2002/Ecore#//EString"/>
  </eClassifiers>
  <eClassifiers xsi:type="ecore:EClass" name="EntityReference">
    <eStructuralFeatures xsi:type="ecore:EAttribute" name="name"
      eType="ecore:EDataType http://www.eclipse.org/emf/2002/Ecore#//EString"/>
    <eStructuralFeatures xsi:type="ecore:EAttribute" name="toMany"
      eType="ecore:EDataType http://www.eclipse.org/emf/2002/Ecore#//EBoolean"/>
    <eStructuralFeatures xsi:type="ecore:EReference" name="target" lowerBound="1"
      eType="#//Entity"/>
  </eClassifiers>
</ecore:EPackage>
```

```
<<IMPORT model>>

<<DEFINE javaClass FOR Entity
    <<FILE name+ ".java">>
        Public class <<name>> {
            <<FOREACH attributes AS attr>>
                public class <<attr.type>>  <<attr.name>>;
            <<ENDFOREACH>>

<<FOREACH references AS ref>>
                public class <<ref.type.name>>  <<attr.ref.name>>;
            <<ENDFOREACH>>
        }
    <<ENDFILE>>
<<ENDDEFINE>>
```

Figure 6

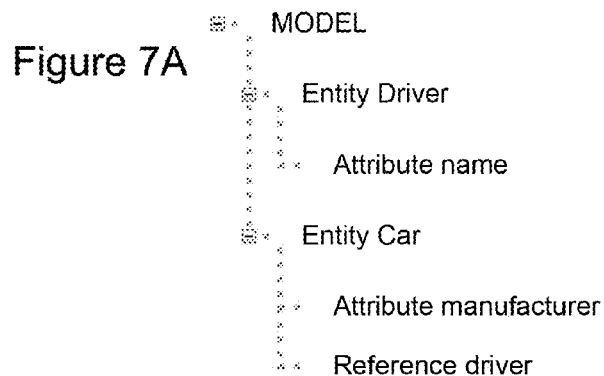

Figure 7A

- MODEL
  - Entity Driver
    - Attribute name
  - Entity Car
    - Attribute manufacturer
    - Reference driver

Figure 7B

```
public class Car {
    public String manufacturer;
    public Driver driver;
}
```

Figure 7C

```
public class Driver {
    public String name;
}
```

DYNAMIC MODEL BASED SOFTWARE APPLICATION DEVELOPMENT

BACKGROUND

Model-driven software development is a process of generating software applications from models. Models are an abstraction of the desired application, often represented graphically and in a manner that is comprehensible by an end-user of the software system.

Normally, models are developed and/or reviewed by persons other than software developers, and developers either create code from scratch, or a code generation process is used to produce source code from the models. The resulting source code may be compiled into an executable program and deployed.

This approach has drawbacks in that with each change to the application, the models must be updated and the source code regenerated, rebuilt, and redeployed before modelers can see the results of their changes and perform appropriate tests. Even if this process is fully automated using code generation, it may result in a high level of developer involvement, as well as system downtime when each change is applied to the test system.

An alternative is to dispense with the code generation and compile steps and instead support direct, interpreted execution of the models. Unfortunately, this flexibility comes at the cost of the high level of performance only achievable with compiled code.

BRIEF DESCRIPTION OF THE DRAWINGS

FIG. 5 is an XMI representation of the metamodel of FIG. 3.

FIG. 6 is an exemplary template for converting the models defined using the meta model of FIG. 3 into java code.

FIG. 7A is an exemplary definition of two entities in metamodel of FIG. 3 shown in a tree structure.

FIG. 7B is a first source code file created by running the template of FIG. 6 against the first model defined in FIG. 6.

FIG. 7C is a second source code file created by running the template of FIG. 6 against the first model defined in FIG. 6.

DESCRIPTION

Technology is presented which provides software applications developed based on modeling techniques. Compiled application code is generated from modeled workflow processes. Dynamic, interactive modeling and testing is provided by testing modeled applications in an interpretive environment before generating and compiling source code of the application. Changes to the modeled software can be incorporated and tested prior to deploying the compiled code to a production environment.

Figure 1:
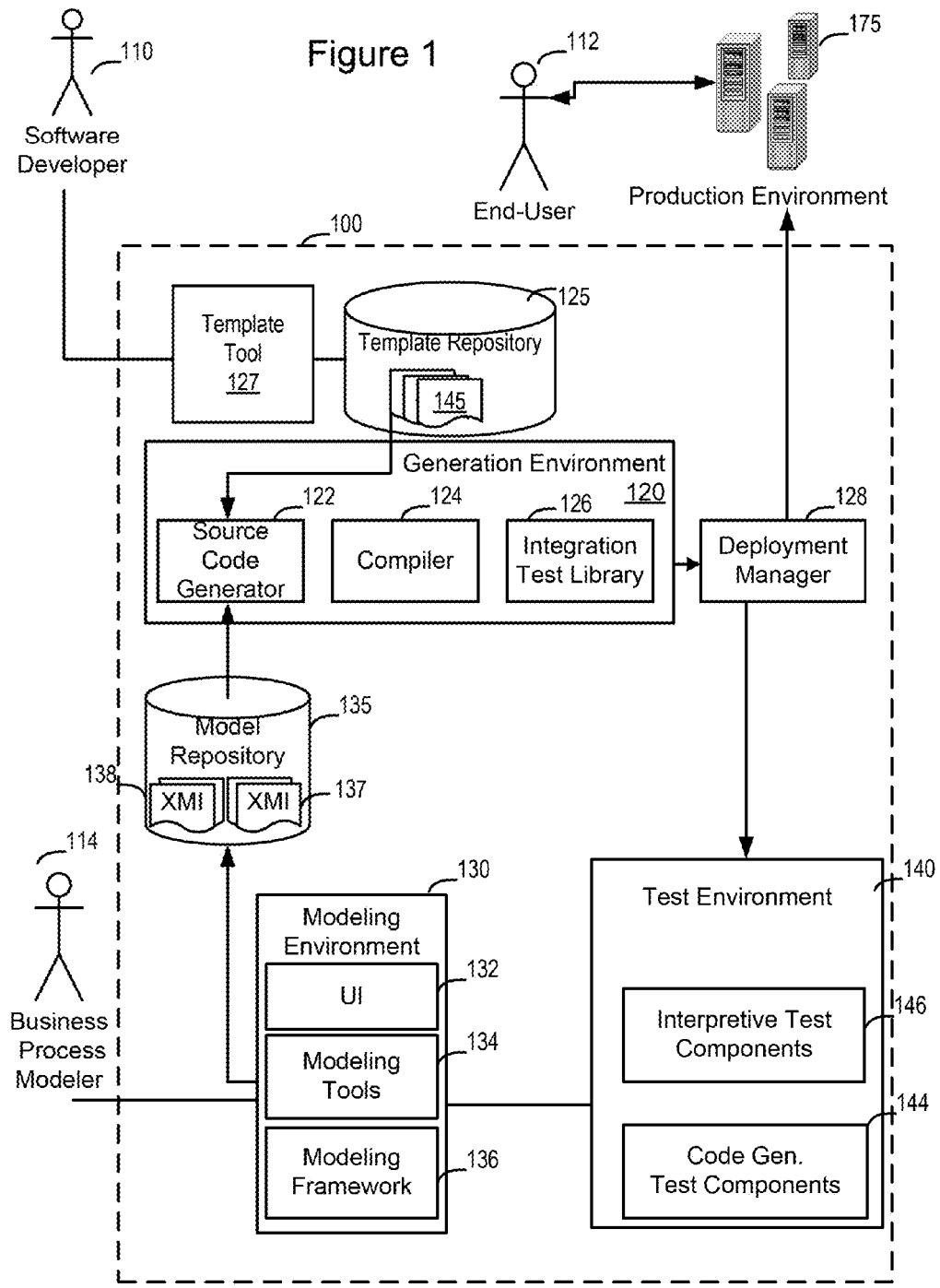
FIG. 1 depicts an environment suitable for utilizing the technology disclosed herein.

FIG. 1 illustrates a software development environment 100 which is used in accordance with the present technology. Software development environment 100 includes a generation environment 120, a modeling environment 130, a test environment 140, and a model repository 135. Software development environment 100 is utilized by two, generally different types of users—a business process developer 114 and a software developer 110—to provide efficient, high throughput compiled application code to a production environment 175. Once in the production environment 175, software applications developed using the technology may be utilized by end users.

A business process developer 114 generally comprises a user having knowledge of particular work flow processes utilized by business entities in the conducting of their business. Application programs may comprise tools to automate human resource management, facilities management, accounting, and other operations. The work flow processes defined by a business process modelers 114 have expertise in the development of the work flow process itself rather than creating software systems to enable the work flow process. Business process modelers may be end users 112 of the application and end users 112 may have expertise in process design to act as business process modelers 114.

A software developer 110 has expertise in developing the software applications to implement business workflow processes which are defined by the business process modeler 114. Traditionally, a business process modeler will create a workflow of the process, and the software developer 110 might create source code to enable a software application in the production environment 175 by directly coding the application. In the present system, the software developer 110 has expertise in developing code generation templates using template tool 127, and in generating code using the code generation environment.

Figure 8:
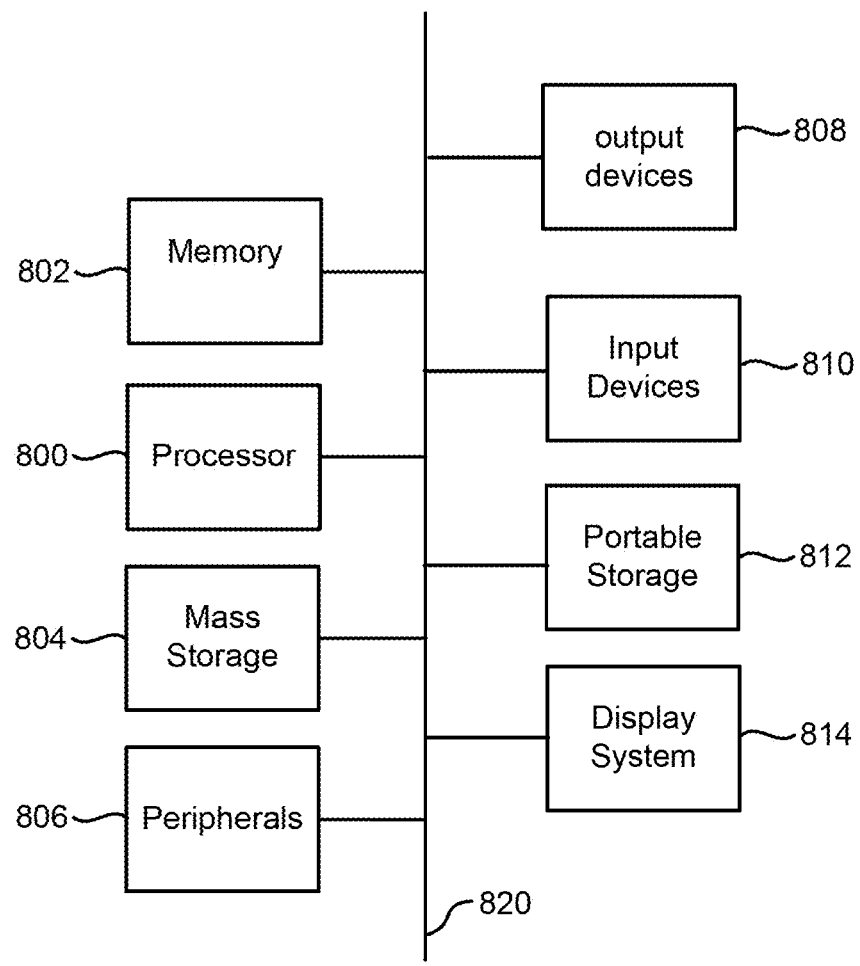
FIG. 8 illustrates an exemplary hardware computing device for the present technology.

End users 112 are generally business people who interact with the software system created by the development system 100 via the production environment 175. Production environment 175 may consist of one or more physical or virtual processing devices or device clusters on which compiled application code for software applications are provided to users. A basic processing device structure is illustrated in FIG. 8.

Modeling environment 130 is a tool allowing a business process modeler to create representations of the workflow processes using model driven engineering techniques. Any number of different commercially available modeling environments may be utilized as modeling environment 130. In general, the modeling environment may include modeling tools 134, a modeling framework 136, and a user interface 132. The modeling framework defines a known set of rules and structures for defining models of application software. The modeling tools 134 and user interface 132 allow a business process modeler 114 to interact with the modeling framework 136. In one embodiment, the modeling tools 134 may be a Unified Modeling Language (UML) editing tool, providing a user interface 132 allowing business process developers to use the UML standardized modeling language to represent business workflows as UML models. A UML tool provides a user interface 132 to develop UML models such as that shown in FIG. 3. The modeling framework 136 defines rules for creating models in UML, can interpret UML models and convert models to other formats.

UML can be used to define Class Diagrams, Collaboration Diagrams, State Diagrams, and the like. Using a combination of UML diagrams, a complete model of an application can be specified. This model may be used as the input from which to generate an application.

The modeling framework 136 which provides a structure for interpreting the models and metamodels defined by the modeling tools. Each metamodel describes one or more components of the business process, and how models are built within the metamodel. Metamodels provided by the modeling framework provide the frames, rules, constraints, models and theories applicable and useful for modeling a predefined class of problems. The metamodel highlights the properties in the model itself and all models with the metamodel conform with the metamodel definition. The modeling framework 136 may include tools and utilities to develop, test and evaluate the models created, as well as convert models created by the modeling tools 134 into other formats which may be used by other components of the system 100.

The modeling framework 136 may comprise an Eclipse-based modeling framework, such as the Eclipse Modeling Framework available from the Eclipse Foundation, (www.eclipse.org). The Eclipse Modeling Framework is a framework and code generation facility for building tools and other applications based on a structure data model. The Eclipse Modeling Framework provides tools and run time support to produce a set of Java classes for the model along with adaptor classes that enable viewing and command based editing in the model and a basic editor within the modeling framework. As such, the Eclipse Modeling Framework includes modeling tools 134. It will be recognized that development languages other than Eclipse and other development modeling frameworks may be utilized in accordance with the present technology.

Modeling framework 136 includes facilities for outputting the model description generated in the model framework to a format which may be understood by the code generation environment. One such format for sharing objects is XML Metadata Interchange (XMI), a widely used interchange format for sharing objects using XML.

Figure 4:
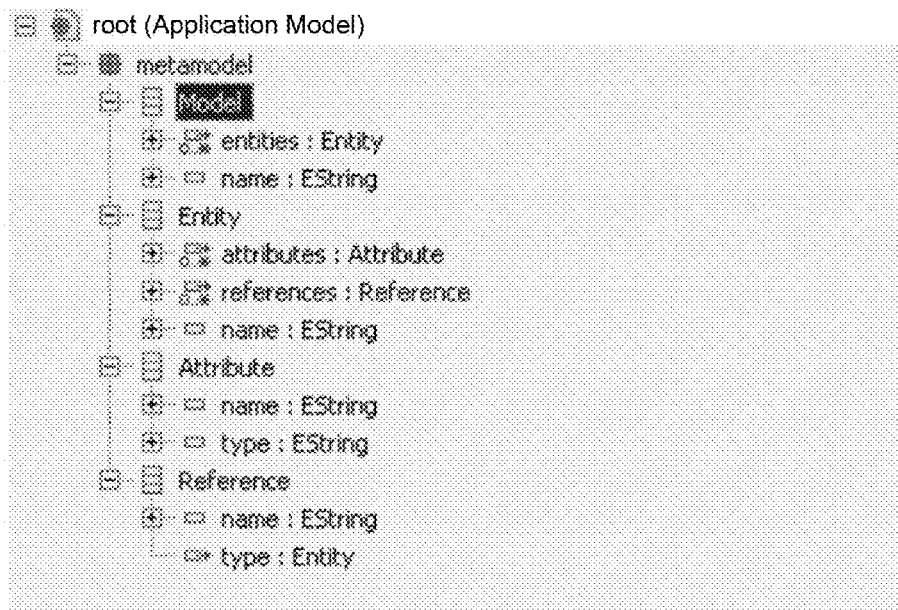
FIG. 4 is a tree representation of the metamodel shown in FIG. 3.

It will be recognized that any number of different modeling tools 134, interfaces 132 and frameworks 135 may be used to develop models in accordance with the present technology. For example, models may be developed in the Eclipse Modeling Framework with a user interface 132 and Eclipse modeling tools which illustrate models and metamodels in the form of a tree structure, as illustrated in FIG. 4. Models in either UML or Eclipse may be output directly to an interchange format, illustrated in FIG. 5. In another embodiment, modeling tools 134 and user interface 132 may simply comprise a text editor to create models in a recognized format for the code generation environment 120.

Models created in a modeling environment 130 can be output to a model repository 135. As illustrated in FIG. 1, the model repository includes a plurality of models 138 and metamodels 137 defined in XMI format. However, the models may be stored in other formats which can be interpreted by the generation environment 120. It will be recognized that the various formats of models defined in various different modeling frameworks and based on different metamodels may be stored in model repository 135 for use by the code generation environment 120.

In one embodiment, the model repository 135 is a Subversion Repository system. A Subversion Repository is a version control system used to maintain current and historical versions of different types of files, including source code, models, web pages, and documentation. Subversion is an open source development available at http://subversion.tigris.org/. Other different types of change management repositories and version control systems may be utilized in model repository 135.

Models developed within the modeling environment 130 may be provided to a test environment 140. A test environment 140 includes an interpretive components 146 and a generated code components 144. The test environment allows models developed in the modeling environment 130 to be executed and tested. In the test environment 140, models and metamodels are either executed directly or based on interpreted code generated from the models. The test environment 140 may execute modeling framework code or translate it into some efficient intermediate representation (or code) for execution. The test environment 140 will generally run interpreted code more slowly and less efficiently than compiled code provided by the generation environment 120. In one embodiment, the test environment 140 generates Java source code files that are implementations of classes that configure programming logic to be executed by a small run time kernel in the test environment 140. When a business process modeler 114 pushes models or changes to models from the modeling environment 130 to the test environment 140, program logic defined by the compiled code in the interpretative model test environment is reconfigured and can be executed in the test environment to determine whether the model will operate as designed by the modeling environment.

In one embodiment, the test environment 140 is an online mixed compiled-and-interpreted test environment which includes modeled changes in the form of interpreted components 146 and unchanged components from the compiled application in the form of code generated components 144. As will be described below, the generation environment 120 outputs compiled application code which is provided to a production environment 175 for use by end users 112. In one implementation of the technology, compiled application code created by the generation environment 120 may be returned to the test environment 140 for use in testing new or changed models in the generated code test environment 144. Compiled code may be used with interpreted modeled changes having relationships with unchanged components of compiled code before committing the modeled changes to a code generation process.

Code generation environment 120 comprises tools and components to create and deploy compiled code from the models created in the modeling environment 130. The generation environment 120 includes a source code generator 122, compiler 124, and integration test library 126. A template creation tool 127 and template repository 125 may be included in the generation environment or provided as separate tools.

Source code generator 122 uses code generation templates 145 to create application source code based on models 138 stored in model repository 135. Source code generator 122 provides source code which can be compiled by a compiler 124 and tested using an integration test library 126 within the generation environment 120. Code generation templates 145, created by and stored in a template repository 125 by the software developer 110, define methods for creating source code implementing the models 137 pushed to the model repository 135. Templates are created by the software developer 112 based on the metamodels 137. A template creation tool 127 may be integrated into the code generation environment 120 or may be a separate tool. In one embodiment, a template tool may comprise a text editor use to create templates such as those illustrated in FIG. 6. Templates 145 support features necessary for building code from each of the metamodels, and thus the structure of the metamodels 137 is available to the software developer 110. Template tools may include the ability to import metamodels 137 to enable developers 110 to understand the structure of the metamodel as necessary to create code generation templates 145.

One suitable code generator 122 comprises an open source platform for model driven software development known as openArchitectureWare. openArchitectureWare is an open source suite of tools and components assisting with model driven software development with a source code generator 122 implemented in Java and supporting arbitrary import format metamodels and output code formats. openArchitectureWare includes tools for developing models based on an Eclipse modeling framework, and hence in one embodiment, the modeling environment 130 and source code generator 122 may be combined. In addition, openArchitectureWare includes a template tool 127 capable of importing models in any of a number of modeling languages or formats which can then be used to create templates 145.

In one implementation, the source code generator 122 can read XMI models defined by the modeling framework 130 and output source code based on templates created by the software developer.

A compiler 124 transforms source code created by the source code generator 122 into compiled application code.

An integration test library includes integration test code to conduct reliability testing on the compiled code. In one embodiment, the integration test library 126 may contain a series of jUnit tests. jUnit is a open source framework for Java which enables repeatable tests for expected behavior between the output of compiled application code and output generated by the models in the integration test environment 142.

A deployment manager 128 manages deployment of the executable code provided by the compiler to a production environment 175 once testing is completed within the generation environment. The deployment manager 128 may include a code and versioning repository as well as systems management tools to install the compiled application code in the production environment 175. The production environment 175 includes one or more processing devices executing the compiled code to allow end users 112 to make use of developed software. Within the production environment, each end user may access the application in a known manner using one or more processing devices.

Figure 2:
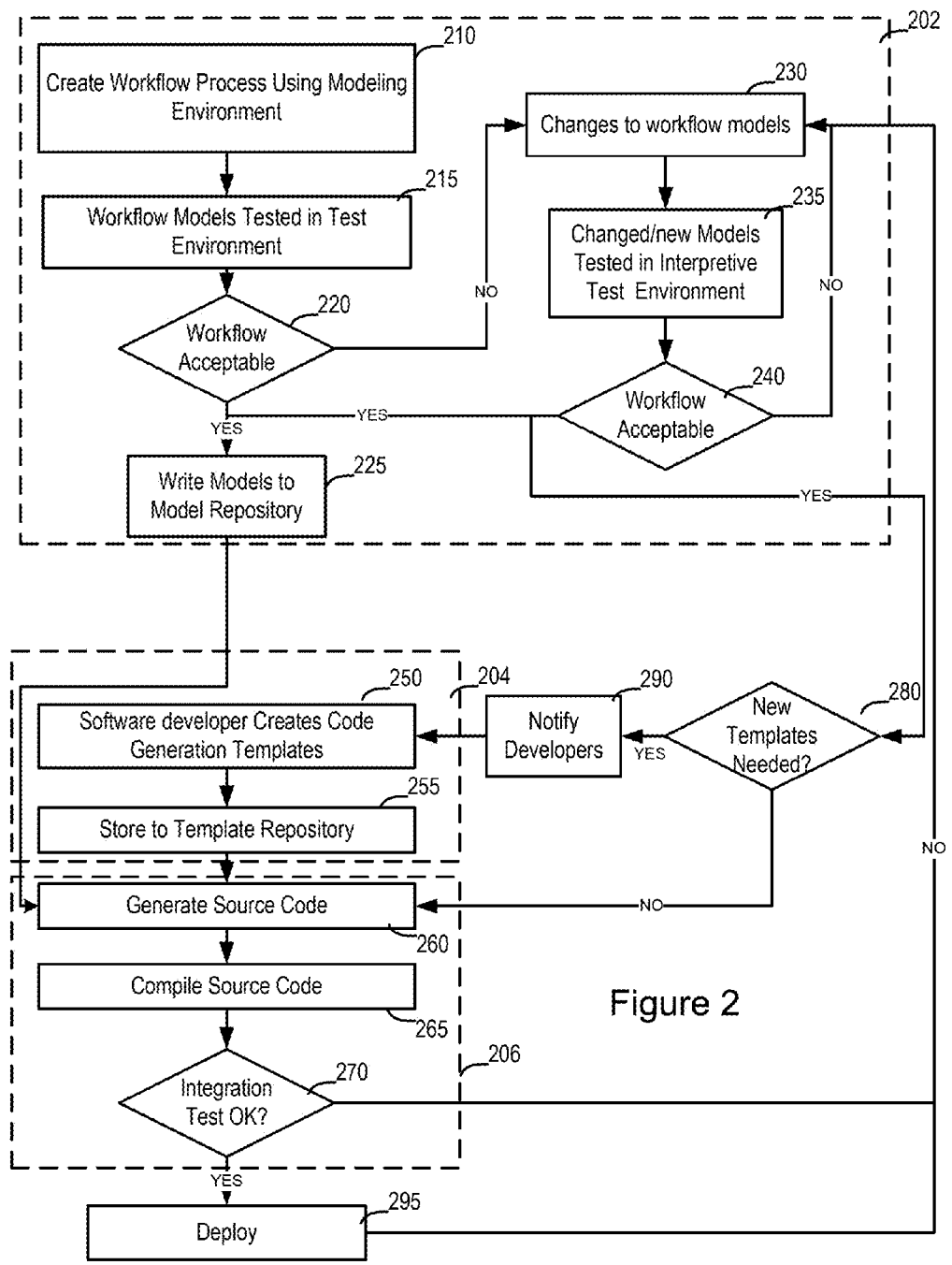
FIG. 2 illustrates a method in accordance with the present technology.

FIG. 2 illustrates the development process utilized in accordance with the present technology. The development process includes a modeling process 202, a template generation process 204 and a code generation process 206.

At 210, a business process developer creates a workflow process using a modeling environment at 210. The work flow process models define the work flow process in terms of the modeling environment 130 in use in the system 100.

Figure 3:
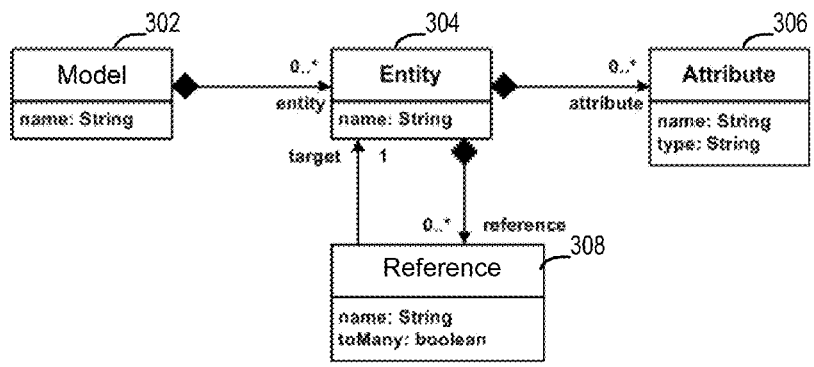
FIG. 3 is a UML representation of a basic metamodel.

An exemplary model in different forms is illustrated in FIGS. 3-5. An exemplary metamodel created in UML notation by, for example, an UML modeling tool is shown in FIG. 3. A corresponding illustration of the metamodel structure corresponding to the UML structure of FIG. 3 is illustrated in FIG. 4 in a tree format as may be used in an Eclipse modeling tool. The basic metamodel illustrated in FIG. 3 includes a metaclass Model 302, having a name, attribute, and a number of Entities 304. An Entity class 304 has a name, attribute 306 and references 308. Each Reference 308 has a name and a type, and a reference to another entity 304. Each Attribute 306 has a name and a type, both being strings.

The models illustrated in FIGS. 3 and 4 can be represented in XMI. An XMI representation of this model is illustrated in FIG. 5. As noted above, the model may be created by any one of a number of tools, including a text editor.

Once models are developed at 210, the models can be tested in the test environment at 215. Initial development of an application occurs at 210; as described below, modifications to the application can be tested in conjunction with compiled components when such modifications are made in the modeling environment. As noted above, the test environment includes an interpretive test environment 142 suitable for testing the functions of the modeled work flow processes and testing at 215 may include an interpreted execution of the model. At 220, the work flow is determined to be acceptable or unacceptable.

At 220, a determination is made as to whether the models produce an acceptable workflow result. If the modeled workflow is acceptable at 220, the models can be written to the model repository at 225. If the workflow is not acceptable, changes can be made to the models of the workflow process at 230. Changes at 230 can be made during an initial development stage of an application or where revisions to application development occur, as described below. The changed models are then tested in the interpretative test environment at 235 and a determination is made at 240 as to whether the new models are acceptable. If the models are not acceptable, the change process continues until the modeled workflow is acceptable at 240 and the models are written to the model repository at 225.

Once the workflow process models are stored in the model repository, source code generation based on the models can take place at 260. However, code generation templates are needed for source code generation.

Template generation process 204 provides the creation of code generation templates at 250. Template generation 250 may occur independently or concurrently with modeling at 202. Code generation templates are defined in terms of the modeling environment used, and the workflow metamodels. During an initial development at 210, 215, 220, a first set of code generation templates is created at 250. Depending on what types of changes are made to metamodels at 230, new code generation templates may be developed when subsequent changes are made to the metamodels at 230, 235, 240. Once the developer creates code generation templates, they are stored to the template repository at 255.

An example of a basic code generation template is illustrated in FIG. 6. The template generates code for the model shown in FIGS. 3-5, creating entities with as attributes as parts of Entities. Templates may be associated with meta classes, in this case the meta class Entity. The template imports the Model metamodel and creates a new file (name+.java) with a name <<name>>. Two FOREACH loops iterate over all the attributes and the references defined in the model, and generate a public attribute and public reference, respectively, in each file. Given a sample instance of the model, shown in FIG. 7A, two files shown in FIGS. 7B and 7C for a Entity "driver" instance and Entity "car" instance result when the code generation is performed at 260.

Source code generation occurs at 260 using the templates created at 250 and models stored in the repository at 225. At 265, the source code is compiled for use in the production environment.

After the source code is compiled, integration tests can occur at 270. Integration testing includes, for example, comparing behavior from the test environment stage at 215, with that expected from the compiled source code at 265. In one embodiment, this may include comparing expected output results from common input. If the results match, then the integration test is successful. If the integration test 270 is not acceptable, then new metamodels may be needed at 230. Once integration testing is completed, deployment can occur at 295.

Once the executable code is deployed to the production environment at 295, additional changes may be made to the workflow process at 230. Changes to models and/or new models and metamodels are created at 230, the changes application tested in the test environment at 235, and if the workflow is acceptable at 240, new models are written to the repository at 225 and a determination made at 280 whether new templates are needed based on the new metamodels at 240. If new templates are needed, notification can be forwarded to the software developers at 290. Once the changed models are written to the model repository, and a new deployment cycle can be initiated at 275.

The system 100 may be operated on one or more computing devices. For example, different systems may be used to host the modeling environment 130, code generation environment 120, repositories 125, 135 and production environment 175. Alternatively one computing device may host all elements of the system 100 and 175.

Figure 9:
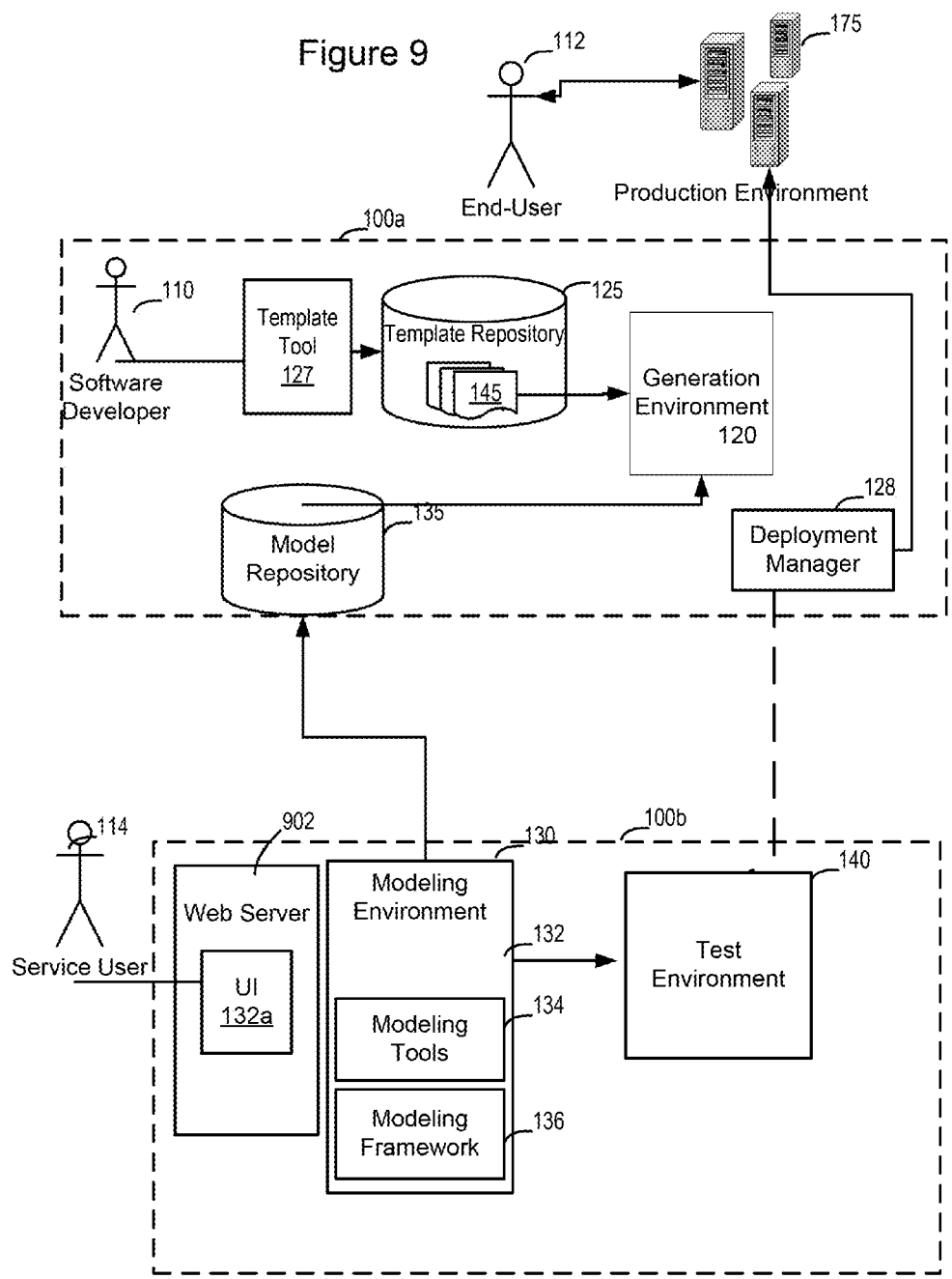
FIG. 9 depicts a second environment suitable for utilizing the technology disclosed herein.

FIG. 8 is a high-level diagram of the computing system which can be used to implement any of the computing devices (including the physical hardware) of FIG. 1 and FIG. 9. The computing system of FIG. 8 includes processor 800, memory 802, mass storage device 804, peripherals 806, output devices 808, input devices 810, portable storage 812, and display system 814. For purposes of simplicity, the components shown in FIG. 8 are depicted as being connected via single bus 820. However, the components may be connected through one or more data transport means. In one alternative, processor 800 and memory 802 may be connected via a local microprocessor bus, and the mass storage device 804, peripheral device 806, portable storage 812 and display system 814 may be connected via one or more input/output buses.

Processor 800 may contain a single microprocessor, or may contain a plurality of microprocessors for configuring the computer system as a multiprocessor system. Memory 802 stores instructions and data for execution by processor 800. If the technology described herein is wholly or partially implemented in software, memory 802 (which may include one or more memory devices) will store the executable code for programming processor 800 to perform the processes described herein. In one embodiment, memory 802 may include banks of dynamic random access memory, high speed cache memory, flash memory, other nonvolatile memory, and/or other storage elements.

Mass storage device 804, which may be implemented with a magnetic disc drive or optical disc drive, is a nonvolatile storage device for storing data and code. In one embodiment, mass storage device 804 stores the system software that programs processor 800 to implement the technology described herein.

Portable storage device 812 operates in conjunction with a portable nonvolatile storage medium, such as a floppy disc, CD-RW, flash memory card/drive, etc., to input and output data and code to and from the computing system of FIG. 8. In one embodiment, system software for implementing the present technology is stored on such a portable medium, and is input to the computer system via portable storage medium drive 812.

Peripheral devices 806 may include any type of computer support device, such as an input/output interface, to add additional functionality to the computer system. For example, peripheral devices 806 may include a network interface for connecting the computer system to a network, a modem, a router, a wireless communication device, etc. Input devices 810 provide a portion of a user interface, and may include a keyboard or pointing device (e.g. mouse, track ball, etc.). In order to display textual and graphical information, the computing system of FIG. 8 will (optionally) have an output display system 814, which may include a video card and monitor. Output devices 808 can include speakers, printers, network interfaces, etc.

The components depicted in the computing system of FIG. 8 are those typically found in computing systems suitable for use with the technology described herein, and are intended to represent a broad category of such computer components that are well known in the art. Many different bus configurations, network platforms, operating systems can be used. The technology described herein is not limited to any particular computing system.

Alternative implementations of the present technology include exposing the modeling interface 132 and modeling tools 134 as part of a web service. This alternative implementation is illustrated in FIG. 9. Components in FIG. 9 having like reference numbers are equivalent to those described previously herein. In FIG. 9, a web server 902 is provided to create the user interface 132a to the modeling environment 130. Systems 100a and 100b include elements identical to those described with respect to FIG. 1. In the system of FIG. 9, the components of system 100b may be available via the user interface 132a provided by the web server 902, allowing a system administrator responsible maintaining the components of systems 100a and 100b. A system administrator may be an individual or entity which is authorized to manage the systems and who provides components of the systems as a web service to service users 114. Service users 114 may comprise end users, business process developers and/or software developers. The system administrator may likewise provide a production environment for hosting the compiled application code to the service user.

Service users 114 wishing to create modeled application software may access the modeling environment via the web server 902, design application software models, access the test environment 140 to conduct tests, and commit the models to a software repository 135. Code developers, provided by the system administrator or acting as service users themselves, may then provide code generation templates 145 and create application source code which may be compiled and integration tested in the manner set forth above with respect to FIGS. 1 and 2. An interface for integration testing may be exposed to the web server 902, allowing the service user the capability of determining when to commit compiled code to a production environment 175.

As noted above, the present technology may be utilized to create application workflows for various types of business workflow processes and may include such tasks as document management including document creation using templates, record creation and data entry in the areas of human resource management, legal process workflows, facilities management, accounting, data entry in various fields and other customized business process operations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method for providing application software implementing workflows, comprising:
creating an application set based at least in part upon one or more workflow models;
testing the application set in a testing environment;

generating source code from the application set using a code generator;

compiling the source code into compiled code;

modifying the application set to create a modified application set including at least one modified workflow model;

reconfiguring the compiled code to generate an interpreted component to operate with the at least one modified workflow model via interpretation and an unchanged component to operate via direct execution by a processor;

testing the modified application set in the testing environment, the interpreted component and the at least one modified workflow model being interpreted and the unchanged component being executed directly by the processor;

modifying the code generator to generate a modified code generator based on the modified application set;

generating modified source code based at least in part upon the modified application set using the modified code generator; and compiling the modified source code into modified compiled code.

2. The method of claim 1, further comprising:

storing the application set and the modified application set in a model repository including respective versioning information for each of the one or more workflow models and the at least one modified workflow model.

3. The method of claim 1, wherein testing the application set comprises interpreting the one or more workflow models and the at least one modified workflow model.

4. The method of claim 1, wherein generating the source code comprises:

creating code generation templates; and executing the code generator using the code generation templates.

5. The method of claim 4, wherein the code generation templates are maintained in a version tracking repository.

6. The method of claim 4, wherein modifying the code generator comprises modifying the code generation templates based at least in part upon the at least one modified workflow model.

7. The method of claim 1, wherein creating the application set comprises creating one or more metamodels defining one or more processes and one or more data models each having an instance of a class of the one or more metamodels.

8. The method of claim 1, further comprising:

deploying at least one of the compiled code and the modified compiled code into a production environment and the testing environment.

9. A method of providing application software embodying a workflow, comprising:

creating application software based at least in part upon one or more models of a workflow;

testing the application software in a test environment;

generating source code based on the one or more models;

compiling the source code into compiled code;

modifying the application software to create at least one modified model;

reconfiguring the compiled code to generate an interpreted component to operate with the at least one modified model via interpretation and an unchanged component to operate via direct execution by a processor;

testing the at least one modified model in the test environment, the interpreted component and the at least one modified model being interpreted and the unchanged component being directly executed by the processor; and creating modified compiled application software including the at least one modified model.

10. The method of claim 9, further comprising:

outputting the models to an interchange format.

11. The method of claim 9, wherein generating the source code comprises:

creating code generation templates based on the models; and executing a code generator using the code generation templates.

12. The method of claim 11, wherein creating the modified compiled application software comprises:

modifying the code generation templates to generate modified code generation templates based on the at least one modified model;

executing the code generator with the modified code generation templates to generate modified source code; and compiling the modified source code into the modified compiled application software.

13. The method of claim 9, wherein testing the application software comprises interpreting the models and the at least one modified model.

14. The method of claim 9, further comprising:

deploying the compiled application software to a production environment and the test environment.

15. The method of claim 9, further comprising:

deploying the modified compiled application software to a production environment and the test environment.

16. A system for providing application software embodying a workflow, comprising:

a processor;

a memory device including instructions that, when executed by the processor, cause the processor to:

create application software based at least in part upon one or more models of a workflow;

test the application software in a test environment;

generate source code based on the one or more models;

compile the source code into compiled code;

modify the application software to create at least one modified model;

reconfigure the compiled code to generate an interpreted component to operate with the at least one modified model via interpretation and an unchanged component to operate via direct execution by the processor;

test the at least one modified model in the test environment, the interpreted component and the at least one modified model being interpreted and the unchanged component being directly executed by the processor; and create modified compiled application software including the at least one modified model.

17. The system of claim 16, wherein the instructions to test the application software comprise instructions when executed by the processor to cause the processor to:

interpret the models and the at least one modified model.

18. The system of claim 16, wherein the instructions to create the modified compiled application software comprise instructions when executed by the processor to cause the processor to:

modify code generation templates to generate modified code generation templates based on the at least one modified model;

execute a code generator with the modified code generation templates to generate modified source code; and compile the modified source code into the modified compiled application software.

19. A method for providing software, comprising:
  providing a modeling environment and a user interface for the modeling environment;
  receiving one or more models of a workflow created using the modeling environment;
  providing a test environment for testing of the one or more models via the user interface;
  creating one or more source code generation templates based on the one or more models;
  generating source code using a code generator and the one or more code generation templates;
  compiling the source code into compiled code;
  deploying the compiled code to a production environment and the test environment;
  receiving at least one modified model;
  reconfiguring the compiled code to generate an interpreted component to operate with the at least one modified model and an unchanged component to operate via direct execution by a processor; and
  testing the at least one modified model via the user interface, the interpreted component and the at least one modified model being interpreted and the unchanged component being directly executed by the processor.

20. The method of claim 19, wherein receiving the at least one modified model is in response to testing of the compiled code, the method further comprising:
  creating one or more modified code generation templates based on the at least one modified model.

21. The method of claim 20, further comprising:
  generating modified source code using the code generator and the one or more modified code generation templates;
  compiling the modified source code into modified compiled code; and
  deploying the modified compiled code in the production environment and the test environment.

22. A non-transitory computer-readable storage medium including instructions for providing software embodying a workflow, the instructions when executed by a processor causing the processor to:
  create application software based at least in part upon one or more models of a workflow;
  test the application software in a test environment;
  generate source code based on the one or more models;
  compile the source code into compiled code;
  modify the application software to create at least one modified model;
  reconfigure the compiled code to generate an interpreted component to operate with the at least one modified model via interpretation and an unchanged component to operate via direct execution by the processor;
  test the at least one modified model in the test environment, the interpreted component and the at least one modified model being interpreted and the unchanged component being directly executed by the processor; and
  create modified compiled application software including the at least one modified model.

23. The non-transitory computer-readable storage medium of claim 22, wherein the instructions when executed to cause the at least one processor to test the application software include causing the at least one processor to:
  interpret the models and the at least one modified model.

24. The non-transitory computer-readable storage medium of claim 22, wherein the instructions when executed to cause the at least one processor to create the modified compiled application software include causing the at least one processor to:
  modify code generation templates to generate modified code generation templates based on the at least one modified model;
  execute a code generator with the modified code generation templates to generate modified source code; and
  compile the modified source code into the modified compiled application software.

* * * * *